US006816661B1

(12) United States Patent
Barnes et al.

(10) Patent No.: US 6,816,661 B1
(45) Date of Patent: Nov. 9, 2004

(54) MULTIFIBER CONNECTOR, INSTALLATION TOOL AND ASSOCIATED METHODS OF VALIDATING OPTICAL FIBER CONTINUITY

(75) Inventors: Brandon A. Barnes, Ft. Worth, TX (US); Michael de Jong, Ft. Worth, TX (US); Thomas A. Church, Saginaw, TX (US); Markus A. Giebel, Hickory, NC (US); Sean M. Kerr, Trophy Club, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/532,722

(22) Filed: Mar. 22, 2000

Related U.S. Application Data

(62) Division of application No. 09/532,772, filed on Mar. 22, 2000, now Pat. No. 6,499,672, which is a division of application No. 09/433,299, filed on Nov. 3, 1999, now Pat. No. 6,244,521.

(51) Int. Cl.$^7$ .................................................. G02B 6/00
(52) U.S. Cl. .......................................... 385/134; 385/59
(58) Field of Search .............................. 385/53, 55, 56, 385/59, 60, 62, 66, 70–72, 83, 134

(56) References Cited

U.S. PATENT DOCUMENTS 6,173,097 B1 * 1/2001 Throckmorton et al. ...... 385/59
6,379,054 B2 * 4/2002 Throckmorton et al. ...... 385/66
6,439,780 B1 * 8/2002 Mudd et al. .................. 385/83
6,442,318 B1 * 8/2002 Goldman .................... 385/114

* cited by examiner

*Primary Examiner*—Khiem Nguyen

(57) ABSTRACT

Methods are provided for validating the continuity of one or more optical fibers upon which a fiber optic connector is mounted. Typically, the fiber optic connector is mounted upon an optical field fiber by actuating a cam mechanism to secure the optical field fiber in position relative to an optical fiber stub. If subsequent testing indicates that the continuity of the optical field fiber and the optical fiber stub is unacceptable, the cam mechanism can be deactuated, the optical field fiber can be repositioned and the cam mechanism can be reactuated without having to remove and replace the fiber optic connector. In order to determine if continuity has been established between the optical field fibers and respective optical fiber stubs, a method is also provided that introduces light into at least one of each pair of optical field fibers and optical fiber stubs and that only secures the position of each optical field fiber relative to the respective optical fiber stub once the glow associated with each pair of optical field fibers and optical fiber stubs dissipates, which dissipation indicates the establishment of continuity. An improved multifiber connector and installation tool are also provided to facilitate the establishment and validation of the continuity of optical field fibers and optical fiber stubs in order to reduce the time and cost required to connectorize optical field fibers in the field.

17 Claims, 6 Drawing Sheets

MULTIFIBER CONNECTOR, INSTALLATION TOOL AND ASSOCIATED METHODS OF VALIDATING OPTICAL FIBER CONTINUITY

This is a divisional of application Ser. No. 09/532,772, filed Mar. 22, 2000, now U.S. Pat. No. 6,499,672, which is a divisional of application Ser. No. 09/433,299, filed Nov. 3, 1999, now U.S. Pat. No. 6,244,521.

FIELD OF THE INVENTION

The present invention relates generally to the connectorization of optical fibers and, more particularly, to multifiber connectors, installation tools and associated methods for validating optical fiber continuity during the connectorization process.

BACKGROUND OF THE INVENTION

Although fiber optic connectors can generally be most efficiently and reliably mounted upon the end portions of optical fibers in a factory setting during the production of fiber optic cable, many fiber optic connectors must be mounted upon the end portions of optical fibers in the field. As such, a number of fiber optic connectors have been specifically developed to facilitate field installation. One advantageous type of fiber optic connector that is specifically designed to facilitate field installation is the UNICAM® family of fiber optic connectors provided by Siecor Corporation of Hickory, N.C. While the UNICAM family of fiber optic connectors includes a number of common features including a common splicing technique, the UNICAM family of fiber optic connectors has several different styles of connectors including UNICAM connectors adapted to be mounted upon a single optic fiber and UNICAM connectors adapted to be mounted upon two or more optical fibers, such as the MT-RJ UNICAM connector. See, for example, U.S. patent application Ser. No. 09/108,451 filed Jul. 1, 1998 and assigned to Siecor Corporation, which describes a multifiber connector, such as an MT-RJ UNICAM connector, adapted to be spliced onto the end portions of a plurality of optical fibers. The contents of this patent application are hereby incorporated by reference in their entirety.

By way of example of an advantageous fiber optic connector designed for field installation, FIG. 1 depicts an MT-RJ UNICAM® connector 10. The connector generally includes a ferrule 12 defining one or more bores for receiving respective optical fiber stubs. The optical fiber stubs are preferably sized such that one end of the optic fiber stubs extends rearwardly beyond the ferrule. The MT-RJ UNICAM® connector also includes splice components, at least one of which defines a groove for receiving an end portion of each optical field fiber upon which the fiber optic connector is to be mounted. In order to mount the fiber optic connector upon optical field fibers, the splice components are positioned proximate the rear end of the ferrule, such that the end portions of the optical fibers stubs that extend rearwardly beyond the ferrule are disposed within the respective grooves defined by the splice components. Thereafter, end portions of the optical field fibers can also be inserted into the respective grooves defined by the splice components. By inserting the optical field fibers into the grooves defined by the splice components until respective end portions of the optical fiber stubs and the optical field fibers make contact, optical connections can be established between respective pairs of the optical fiber stubs and the optical field fibers. In this regard, the contact between the end portions of the optical fiber stubs and the optical field fibers establishes optical continuity between respective pairs of the optical fiber stubs and the optical field fibers. The splice components can then be actuated, such as by means of a cam member 20, in order to force the splice components together and to secure the end portions of the optical fiber stubs and the optical field fiber in position within the respective grooves defined by the splice components.

In order to facilitate the connectorization of optical fibers in the field, installation tools have also been developed. For example, U.S. Pat. No. 5,040,867 to Michael de Jong et al. and U.S. Pat. No. 5,261,020 to Michael de Jong et al. describe installation tools for facilitating the connectorization of optical fibers in the field. In addition, a UNICAM® installation tool kit is provided by Siecor Corporation of Hickory, N.C., to facilitate the mounting of the UNICAM® family of connectors upon the end portions of optical field fibers in the field. An installation tool holds a number of components of the fiber optic connector including the ferrule and the splice components while the optical field fibers are inserted into the fiber optic connector and aligned with the respective optical fiber stubs.

In this regard, one conventional installation tool includes a base and a tool housing mounted upon the base. The installation tool also includes an adapter disposed within the tool housing. The adapter has a first end for engaging the fiber optic connector that is to be mounted upon the optical field fibers and an opposed second end that is a dust cap. The installation tool also includes a bias member mounted within the tool housing that engages a shoulder defined between the first and second ends of the adapter in order to secure the adapter in position within the tool housing. Typically, the bias member includes a slide member slidably connected to the tool housing and a biasing element, such as a spring, for urging the slide member into engagement with the shoulder defined by the adapter. The slide member generally includes an engagement portion having a U-shape through which the second end of the adapter extends. In addition, a conventional slide member includes a base portion disposed between the tool housing and the base and connected to the engagement portion by means of a connecting element that extends through a lengthwise extending slot defined by the tool housing. Thus, the movement of the connecting element through the slot defined by the tool housing guides the corresponding movement of the slide member in a lengthwise direction relative to the tool housing in order to engage the shoulder defined by the adapter, thereby securing the adapter in position within the tool housing.

In order to mount the fiber optic connector upon the end portions of the optical field fibers, the fiber optic connector is mounted within the installation tool. In particular, the forward end of the fiber optic connector is engaged by the first end of the adapter which, in turn, is secured within the tool housing once the slide member is biased into engagement with the shoulder defined by the adapter. The end portions of the optical field fibers are then inserted into the rear end of the fiber optic connector and the splice components are subsequently actuated, such as by being cammed together, in order to secure the optical field fibers relative to respective optical fiber stubs. The crimp tube 24 of the fiber optic connector is then crimped about the optical field fibers and, in some applications, a crimp band 26 is crimped to the strength members surrounding the optical field fibers in order to provide strain relief and otherwise protect the splice connections of the optical field fibers and the optical fiber stubs.

Once fiber optic connectors have been mounted upon the opposed end portions of the optical field fibers, the resulting fiber optic cable assembly is preferably tested end-to-end. Among other things, this testing is designed to insure that optical continuity has been established between the optical fiber stubs and respective optical field fibers. While fiber optic cables can be tested in different manners, one test involves the introduction of light having a predetermined intensity into each optical fiber stub. By measuring the light following its propagation through the fiber optic cable assembly and, more particularly, by measuring the insertion loss and back reflectance onto each optical fiber stub with a power meter, the continuity of each optical field fiber and the respective optical fiber stub can be determined. If the testing indicates that the optical fibers are not sufficiently continuous, the technician must either scrap the entire fiber optic cable assembly or, more commonly, replace one or both fiber optic connectors in an attempt to establish the desired continuity. In order to replace the fiber optic connectors, a technician generally removes, i.e., cuts off, one of the fiber optic connectors and repeats the connectorization process described above by mounting a new fiber optic connector within the installation tool and inserting the optical field fibers into the new fiber optic connector. Once the new fiber optic connector has been mounted upon the end portions of the optical field fibers, the new fiber optic connector is removed from the installation tool and the fiber optic cable assembly is again tested. If the optical fibers are still not sufficiently continuous, the fiber optic connector mounted upon the other end of the fiber optic cable assembly is typically removed and replaced as described above, prior to further testing of the resulting fiber optic cable assembly.

While fiber optic connectors and associated installation tools have been developed to facilitate the mounting of the fiber optic connectors upon the end portions of optical field fibers in the field, conventional field connectorization techniques can be quite time consuming and expensive. In this regard, since the continuity testing is not performed until after the fiber optic connectors have been completely mounted to the optical field fibers, one or both of the fiber optic connectors must typically be replaced if the testing indicates a discontinuity between the optical field fibers and the respective optical fiber stubs. This process not only requires additional time to effect the reconnectorization, but also increases the cost of the resulting fiber optic cable assembly by causing a number of potentially functional fiber optic connectors to be disadvantageously scrapped since the testing generally does not indicate which of the fiber optic connectors should be replaced. In this regard, the technician generally randomly picks one of the fiber optic connectors to replace, thereby insuring that a fiber optic connector that has been appropriately mounted upon the optical field fibers is replaced almost half of the time.

The reconnectorization of one or both ends of a fiber optic cable assembly is particularly troublesome for fiber optic cable assemblies that include a plurality of optical field fibers. In this regard, if the testing indicates a discontinuity involving any one of the optical field fibers, the fiber optic connectors mounted upon one or both ends of the fiber optic cable assembly must generally be replaced, even if the other optical field fibers and the optical fiber stubs have the desired continuity.

In order to facilitate continuity testing while the fiber optic connector remains mounted within the installation tool, Siecor Corporation previously developed a modified installation tool for a single fiber CamLite™ ST connector that permitted continuity testing. The installation tool included an adapter having opposed first and second ends, the first end of which was adapted to engage a single fiber CamLite ST connector. In order to test the continuity of the optical fiber, a laser, such as an HeNe gas laser, was provided that delivered red light to the optical fiber stub of the single fiber CamLite ST connector. More particularly, the red light was delivered via an optical fiber upon which another ST connector was mounted. This other ST connector was, in turn, inserted into the second end of the adapter such that the red light was delivered to the optical fiber stub of the single fiber CamLite ST connector. By monitoring the glow emanating from the end portion of the optical fiber stub within the fiber optic connector through a translucent connector body, the technician could determine when contact was established between the optical fiber stub and the optical field fiber based upon the dissipation of the glow, i.e., continuity is presumed to have been established once the glow dissipates. Thereafter, the cam member of the single fiber CamLite ST connector could be actuated to fix the relative positions of the optical field fiber and the optical fiber stub prior to making a final check of continuity.

While the installation tool developed by Siecor Corporation for the single fiber CamLite ST connector advantageously monitored the continuity of an optical field fiber and an optical fiber stub while the single fiber CamLite ST connector remained within the installation tool, this installation tool provided no mechanism for uncamming and repositioning the optical field fiber relative to the optical fiber stub if the continuity was inadequate after cam actuation. As such, the fiber optic connector would still have to be removed from the end portion of the optical fiber and replaced by a new single fiber CamLite ST connector if testing subsequently determined that the optical field fiber and the optical fiber stub were actually discontinuous. In addition, the modified installation tool developed by Siecor Corporation was only capable of mounting a fiber optic connector upon a single optical fiber and, more particularly, mounting a CamLite ST connector upon a single optical fiber and did not permit multifiber connectors to be mounted upon the end portions of a plurality of optical field fibers. As such, improved techniques for mounting multifiber connectors upon optical field fibers in the field and for testing the resulting fiber optic cable assembly are desired in order to reduce the overall time required for the mounting and testing procedures and to correspondingly reduce the cost of the resulting fiber optic cable assembly.

SUMMARY OF THE INVENTION

Methods are therefore provided according to the present invention for validating the continuity of one or more optical fibers upon which a fiber optic connector is mounted. According to one embodiment, the fiber optic connector can be mounted upon an optical field fiber by actuating a cam mechanism to secure the optical field fiber in position relative to an optical fiber stub. If subsequent evaluation indicates that the continuity of the optical field fiber and the optical fiber stub is unacceptable, the cam mechanism can be deactuated, the optical field fiber can be repositioned and the cam mechanism can be reactuated without having to remove and replace the fiber optic connector. In order to determine if continuity has been established between the optical field fibers and respective optical fiber stubs, a method is also provided that introduces light into at least one of each pair of optical field fibers and optical fiber stubs and that only secures the position of each optical field fiber relative to the respective optical fiber stub once the glow associated with each pair of optical field fibers and optical fiber stubs dissipates, which dissipation indicates the establishment of continuity. An improved multifiber connector and installation tool are also provided to facilitate the establishment and validation of the continuity of optical field fibers and optical fiber stubs in order to reduce the time and cost required to connectorize optical field fibers in the field.

According to one advantageous embodiment, a method is provided for validating the continuity of an optical fiber upon which a fiber optic connector is mounted. In this regard, the fiber optic connector includes a ferrule defining at least one bore extending between opposed front and rear faces, an optical fiber stub extending through the bore and beyond the rear face of the ferrule, and a cam mechanism. According to this embodiment, an optical field fiber is advanced into the fiber optic connector while light is introduced into at least one of the optical field fiber and the optical fiber stub. So long as the optical field fiber and the optical fiber stub are discontinuous, a glow will emanate from an end portion of the optical field fiber or the optical fiber stub into which light is introduced. The glow is monitored while the optical field fiber is advanced into the fiber optic connector and further advancement of the optical field fiber is halted once the glow dissipates. The cam mechanism is then actuated to secure the optical field fiber in position relative to the optional fiber stub. Once the cam mechanism has been actuated, the continuity of the optical field fiber and the optical fiber stub is evaluated, preferably while the fiber optic connector remains within the installation tool. If the continuity of the optical field fiber and the optical fiber stub is unacceptable, the cam mechanism is deactuated. The optical field fiber is then repositioned relative to the optical fiber stub. In this regard, the optical field fiber is typically cleaved and cleaned prior to the repositioning to improve the resulting connection. Once the optical field fiber has been repositioned, the cam mechanism is reactuated. The evaluation of the continuity of the optical field fiber and the optical fiber stub as well as any necessary deactuation of the cam mechanism, repositioning of the optical field fiber and reactuation of the cam mechanism can be repeated as necessary to achieve continuity. Once acceptable continuity is obtained, the fiber optic connector can be crimped onto the optical field fibers and, more typically, to the strength members surrounding the optical field fibers.

By permitting repeated repositioning of the optical field fiber prior to crimping the fiber optic connector onto the optical field fibers, the method of this embodiment prevents otherwise acceptable fiber optic connectors from being replaced in an attempt to establish continuity between optical field fibers and optical fiber stubs. Thus, the total time required to mount the fiber optic connectors upon the optical field fibers and to validate the resulting continuity of the optical fibers is decreased according to the method of this embodiment of the present invention. Correspondingly, the cost of the resulting fiber optic cable assembly, on average, is also decreased since fewer fiber optic connectors are removed and scrapped.

In order to permit the glow emanating from the end portion of at least one optical fiber stub or optical field fiber that is indicative of a discontinuity to be viewed, a multifiber connector is also provided according to another embodiment of the present invention. The multifiber connector of this embodiment includes a multifiber ferrule extending lengthwise between opposed front and rear faces for receiving a plurality of optical fiber stubs. The multifiber connector also includes splice components positioned proximate the rear face of the multifiber ferrule for aligning a plurality of optical field fibers with respective ones of the plurality of optical fibers stubs. The multifiber connector also includes a cam mechanism for urging the splice components together to operably interconnect respective pairs of the optical field fibers and the optical fibers stubs. According to this embodiment of the present invention, at least one of the cam mechanism and the splice components is translucent such that the glow emanating from therewithin that is indicative of a discontinuity between at least one pair of optical field fibers and optical fibers stubs is externally visible.

In one embodiment, the cam mechanism of the multifiber connector includes a sleeve in which the splice components are disposed. The sleeve of this embodiment also defines a window through which the splice components are exposed. In addition to the sleeve, the cam mechanism of this embodiment includes a cam member disposed upon the sleeve for engaging the splice components via the window defined by the sleeve. As such, movement of the cam member relative to the sleeve urges the splice components together. In this embodiment, the cam member is typically translucent. As such, the multifiber connector of this embodiment of the present invention permits the connectorization process to be monitored to ensure that continuity is established between each optical field fiber and the respective optical fiber stubs prior to actuating the cam mechanism to secure the optical field fibers in position relative to the respective optical fiber stubs.

An installation tool is also provided according to another embodiment of the present invention for mounting the fiber optic connector upon one or more optical field fibers. The installation tool of this embodiment is capable of being converted between a first configuration that facilitates validation of the continuity of the optical fibers and a second configuration in which the continuity of the optical fibers is untested.

According to this embodiment, the installation tool includes a tool housing extending lengthwise between first and second opposed ends. The installation tool also include first and second adapters capable of being alternately mounted within the tool housing to configure the installation tool in the first and second configurations, respectively. The first adapter has a first end adapted to engage the fiber optic connector that is being mounted upon the optical field fiber and an opposed second end adapted to engage a fiber optic connector that is mounted upon another optical fiber that delivers light for continuity testing. While the second adapter also has a first end adapted to engage the fiber optic connector that is mounted upon the optical field fiber, the second end of the second adapter serves as a dust cap. Each adapter further defines a shoulder between the opposed first and second ends. The installation tool of this embodiment of the present invention also includes first and second bias members capable of being alternately mounted within the tool housing to configure the installation tool in the first and second configurations, respectively. The bias members are adapted to be biased into engagement with the shoulder defined by the respective adapter to thereby secure the respective adapter in position within the tool housing.

According to this embodiment of the present invention, the first and second adapters and the first and second bias members can be interchanged to convert the installation tool between the first and second configurations without otherwise disassembling the installation tool. In this regard, the first adapter and the first bias member can be mounted within the tool housing such that the installation tool has the first configuration that permits testing of the continuity of the optical fibers upon which the fiber optic connector is mounted. Alternatively, the second adapter and the second bias member can be mounted within the tool housing such that the installation tool has the second configuration that does not support continuity testing, but appears and functions in the same manner as a conventional installation tool.

According to this embodiment of the present invention, each bias member preferably includes a slide member and a biasing element for urging the respective slide member into engagement with the shoulder defined by the respective adapter to thereby secure the respective adapter and connector in position within the tool housing. Moreover, each slide member can include an engagement portion capable of being disposed within the tool housing for engaging the shoulder defined by the respective adapter and a base portion disposed on the opposite side of the tool housing from the engagement portion. In addition, each slide member can include a removable connector interconnecting the engagement portion and the base portion. The removable connector extends through a slot defined by the tool housing such that the removable connector rides within the slot as the slide member moves relative to the tool housing. Each slide member preferably includes a common base portion. As such, by removing the removable connector, the engagement portions of the first and second adapters can be interchanged and mounted to the common base portion without otherwise disassembling the installation tool.

Accordingly, the installation tool can be configured to support continuity testing of a fiber optic connector that remains mounted within the installation tool. Alternatively, the installation tool can be configured as a conventional installation tool that does not support continuity testing. By permitting continuity testing without removing the fiber optic connector from the installation tool, however, the installation tool of this embodiment of the present invention further facilitates the rapid repositioning of the optical field fibers relative to the optical fiber stubs in order to achieve continuity without having to scrap the fiber optic connector as required by conventional techniques.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method is provided according to the present invention for validating the continuity of one or more optical field fibers with respective optical fiber stubs carried by a fiber optic connector mounted upon end portions of the optical field fibers. While the method of the present invention can be utilized to perform continuity testing following the mounting of a variety of different fiber optic connectors upon the end portions of the optical field fibers, the method will be hereinafter described by way of example, and not of limitation, in conjunction with continuity testing performed following the mounting of a MT-RJ UNICAM® connector upon the end portions of a pair of optical field fibers.

Figure 1:
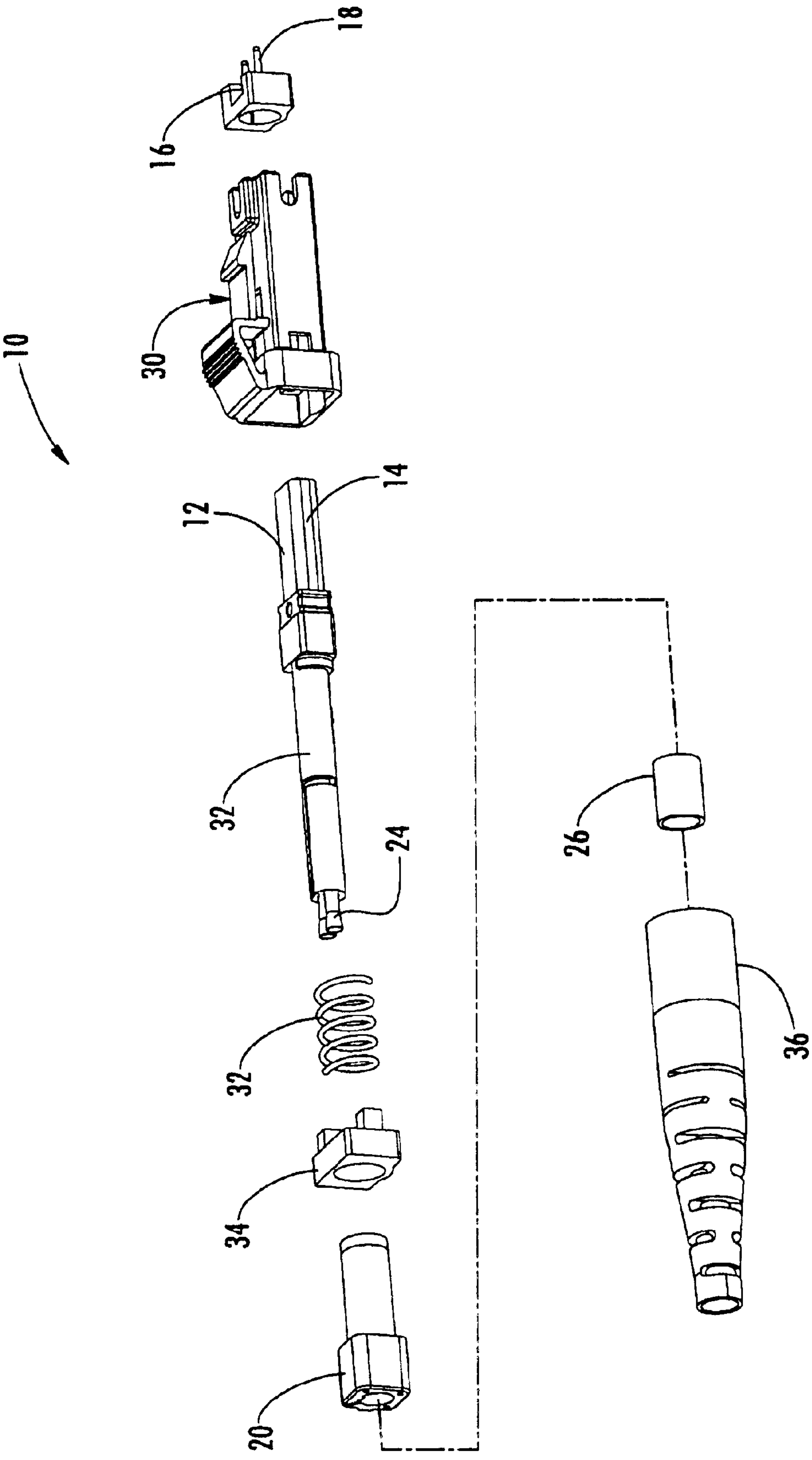
FIG. 1 is an exploded perspective view of an MT-RJ UNICAM® fiber optic connector.

As depicted in FIG. 1 and described in more detail in U.S. patent application Ser. No. 09/108,451, an MT-RJ UNICAM connector 10 is a multifiber connector having a multifiber ferrule 12. A number of optical fiber stubs extend through and are secured within the multifiber ferrule. Depending upon the eventual application of the multi fiber connector and the type of optical fibers upon which the connector will be mounted, the optical fiber stubs can be either multi-mode or single mode optical fiber stubs. In any event, the ferrule defines a plurality of bores that open through a front face of the ferrule for receiving respective optical fiber stubs. While the multifiber ferrule of the illustrated embodiment includes two bores, the multifiber ferrule can include any number of bores depending upon the number of optical field fibers upon which the fiber optic connector is to be mounted. The optical fiber stubs are preferably secured within the multifiber ferrule and, more particularly, within respective bores defined by the ferrule by means of an epoxy or other adhesive.

Once the optical fiber stubs have been secured within the multifiber ferrule 12, the front face of the multifiber ferrule, including the end portions of the optical fiber stubs that are exposed via the bores opening through the front face of the ferrule, is precision polished. Although the multifiber connector 10 is particularly well-suited for field installation, the optical fiber stubs are preferably secured within the multifiber ferrule and the front face of the multifiber ferrule are preferably polished in the factory. The optical fiber stubs also preferably extend rearwardly beyond the rear face of the multifiber ferrule. In this regard, the ends of the optical fiber stubs that extend rearwardly beyond the rear face of the multifiber ferrule have typically been precision cleaved in order to facilitate subsequent splicing to respective optical field fibers.

The multifiber connector 10 also generally includes a sleeve 22, typically termed a ferrule holder, defining a lengthwise extending passageway for at least partially receiving the ferrule 12. For example, the second end of the ferrule is typically secured within one end of the passageway defined by the ferrule holder by means of an epoxy or other adhesive or by means of ultrasonic welding or the like. The multifiber connector also includes splice components disposed within the ferrule holder. As described in copending U.S. patent application Ser. No. 09/108,451, the splice components are commonly formed of first and second splice portions or splice halves which are urged together to securely engage end portions of the optical fiber stubs and the optical field fibers. In this regard, at least one of the splice components defines grooves for receiving the end portions of the optical fiber stubs and the optical field fibers.

Once assembled as shown in FIG. 1, the ferrule holder 22 secures the splice components within the lengthwise extending passageway such that the insertion of the rear end of the multifiber ferrule 12 into the passageway correspondingly inserts the end portions of the optical fiber stubs that extend beyond the rear face of the multifiber ferrule into respective grooves defined by the splice components. The assembled components of the fiber optic connector 10 can then be inserted into a housing 30. In addition, the fiber optic connector can include a spring 32 and an annular spring push member 34 that are mounted upon the ferrule holder and that engage the housing in order to resiliently bias the ferrule forwardly in a longitudinal direction relative to the housing. In order to fabricate a male connector, the fiber optic connector may also include a pin keeper 16 that retains a pair of guide pins 18. During assembly, the forward end of the ferrule can be extended through an opening defined by the pin keeper prior to inserting the ferrule and the ferrule holder into the housing. As such, the guide pins are positioned in respective guide pin passageways 14 defined by the ferrule and extend beyond the front face of the housing.

Once in the field, the end portions of the optical field fibers can also be inserted into respective grooves from the opposite end of the splice components so as to be aligned with and optically connected with respective optical fibers stubs. In this regard, the multifiber connector 10 can also include a crimp tube 24 through which the end portions of the optical field fibers are extended prior to insertion into respective grooves defined by the splice components, thereby facilitating the insertion of the optical field fibers into the respective grooves defined by the splice components.

The ferrule holder 22 preferably defines a window (not shown) and the splice components preferably include a keel. As such, the splice components can be disposed within the passageway defined by the ferrule holder such that the keel is positioned within the window defined by the ferrule holder and is exposed through the window for facilitating actuation of the splice components. The multi fiber connector also includes a cam member 20 that is mounted upon the ferrule holder. The cam member is designed to engage the keel of the splice components that is exposed through the window defined by the ferrule holder. In addition to engaging the exposed keel, the cam member is adapted to actuate the splice components, such as by urging the first and second portions of the splice components toward one another as the cam member is rotated relative to the ferrule holder from a first unactuated position to a second actuated position. Upon actuation of the splice components, the end portions of the optical fiber stubs and the optical field fibers are mechanically coupled or spliced. Further details regarding the manner in which the cam member actuates the splice components are provided by U.S. patent application Ser. No. 09/108,451, the contents of which have been incorporated herein by reference.

Once the splice components have been actuated and the continuity of the optical fiber stubs and the optical field fibers has been validated as described below, the crimp tube 24 can be crimped about the optical field fibers and the remainder of the components of the fiber optic connector 10 can be assembled. For example, the fiber optic connector can include an annular crimp band 26 that is mounted over the crimp tube and upon the end portion of the ferrule holder 22 proximate the cam member 20. The crimp band can also be crimped inwardly in order to engage strength members associated with the optical field fibers that are positioned between the crimp band and the ferrule holder. A boot 36 that has that been previously mounted upon the optical field fibers can also be inserted into the rear end of the housing 30 so as to provide strain relief for the optical field fibers.

Figure 2:
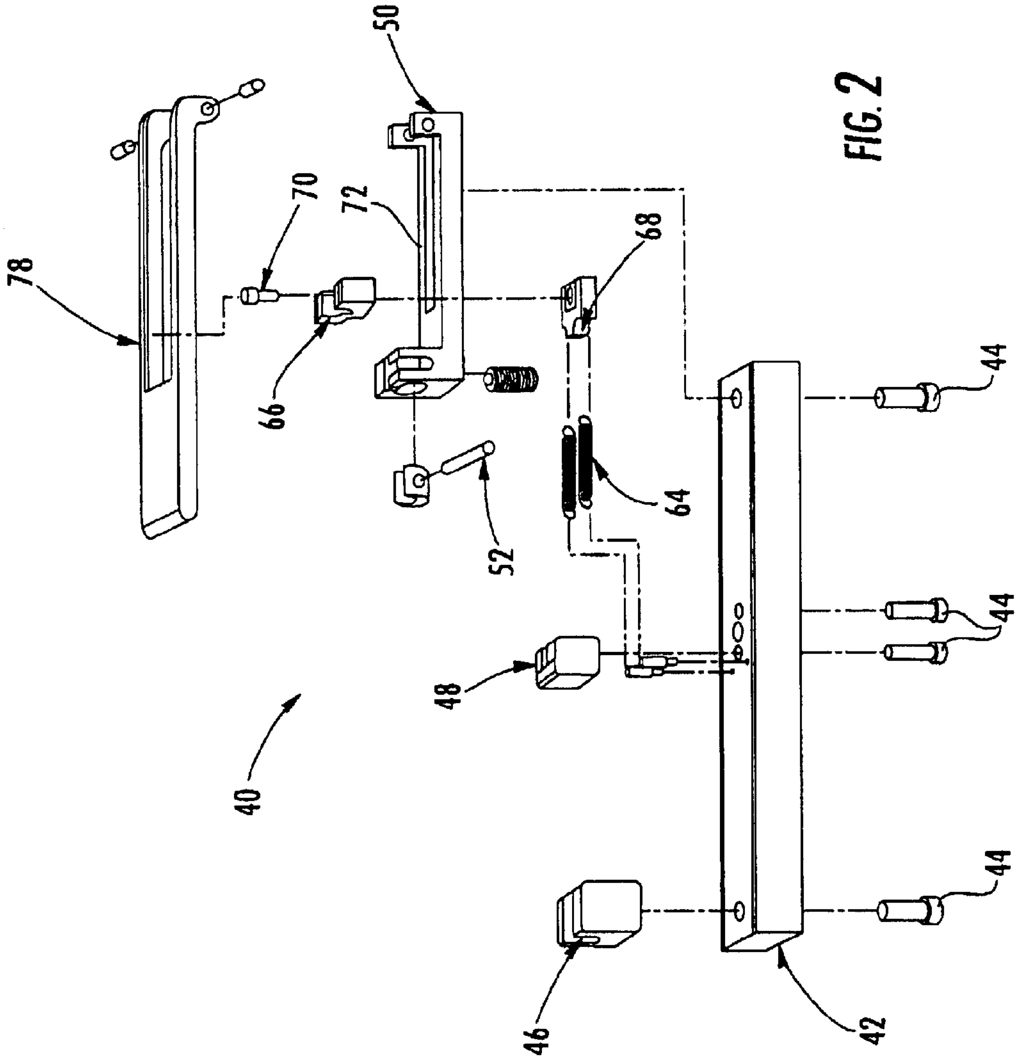
FIG. 2 is an exploded perspective view of an installation tool according to one embodiment of the present invention.
Figure 3:
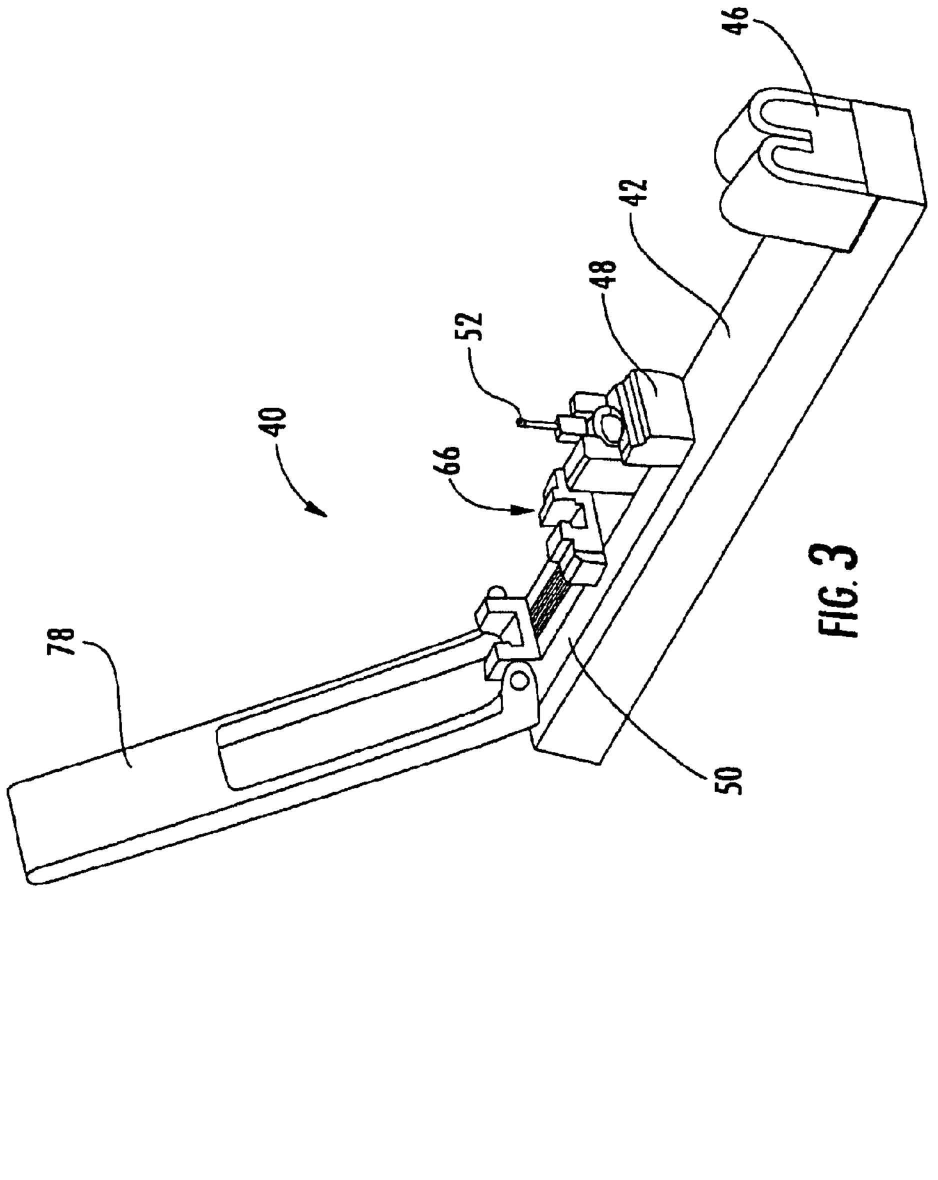
FIG. 3 is a perspective view of the installation tool of FIG. 2 following assembly thereof.

The method for validating the continuity of the optical field fibers and the optical fiber stubs according to the present invention is particularly advantageous for applications in which the fiber optic connector 10 is mounted upon the optical field fibers in the field. As such, an installation tool 40 is provided according to one embodiment of the present invention to facilitate mounting of the fiber optic connector upon the end portions of the optical field fibers. In this regard, FIGS. 2 and 3 depict an exploded perspective view and an assembled perspective view, respectively, of an installation tool. The installation tool typically includes a base 42. Mounted to the base, typically by means of set screws 44, are a fiber holder 46 for holding the optical field fibers, an anvil 48 for facilitating the crimping of crimp tube 24 during assembly of the fiber optic connector, and a tool housing 50. The installation tool also includes a wrench 52 mounted to the tool housing for engaging the cam member 20 of the fiber optic connector and permitting actuation thereof. The installation tool further includes an adapter 54 that is mounted within the tool housing and a bias member 57 that is also mounted within the tool housing for securing the adapter in position therewithin.

Figure 5A:
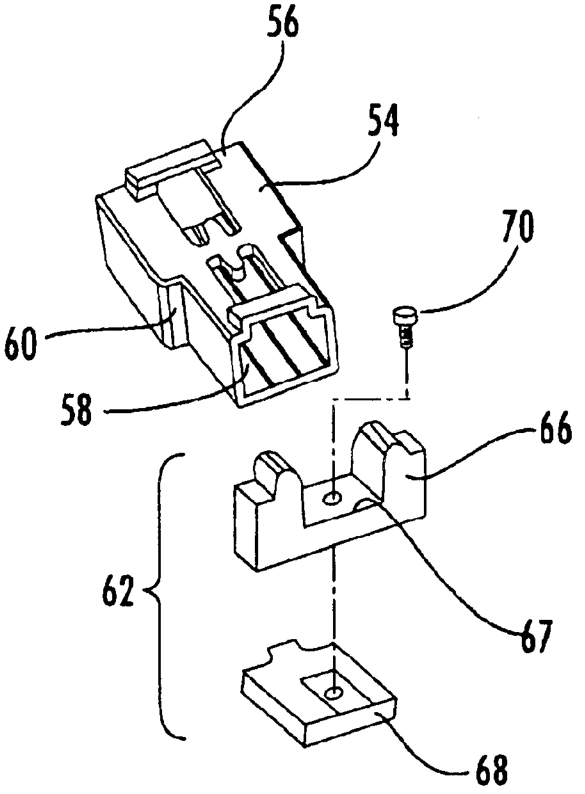
FIG. 5*a* is an exploded perspective view of a portion of the installation tool of FIGS. 2–4 illustrating the adapter and slide member that define the first configuration of the installation tool.
Figure 5B:
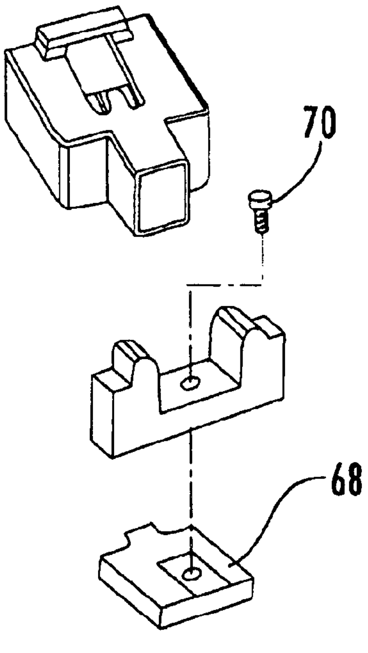
FIG. 5*b* is an exploded perspective view of a portion of the installation tool of FIGS. 2–4 illustrating the adapter and slide member that define the second configuration of the installation tool.

As shown in FIGS. 5*a* and 5*b*, the adapter 54 has opposed first and second ends 56, 58 and defines a shoulder 60 therebetween. The first end of the adapter is designed to engage the fiber optic connector 10 that is being mounted upon the end portions of the optical field fibers. In embodiments in which an MT-RJ UNICAM connector is to be mounted upon the end portions of the optical field fibers, the first end of the adapter is designed to engage the housing 30 of the MT-RJ UNICAM connector, such as by being sized and shaped to receive the housing of the MT-RJ UNICAM connector and defining windows for receiving and engaging corresponding tabs that extend outwardly from the housing.

According to the present invention, the installation tool 40 includes first and second adapters 54 that can be alternately mounted within the tool housing 50 to configure the installation tool to have first and second configurations, respectively. As shown in FIG. 5*a*, the second end 58 of the first adapter is also sized and shaped to engage another fiber optic connector, typically of the same type engaged by the first end 56 of the adapter. As will be described below, the fiber optic connector engaged by the second end of the first adapter is mounted upon the end portion of an optical fiber that serves to deliver light for testing the continuity of the optical fiber stubs and the optical field fibers. Even though the first and second ends of the first adapter are both typically designed to engage the same type of fiber optic connectors, the first and second ends of the first adapter are preferably sized differently so as to thereby define a shoulder 60 that can be engaged by the bias member 57. In contrast to the first adapter, the second adapter is of a more conventional design and has a closed second end that functions as a dust cap. Since the second end of the second adapter is not designed to engage another fiber optic connector, the second adapter is generally smaller than the first adapter.

By providing two different adapters 54, the installation tool 40 of the present invention can be differently configured depending upon its application. For example, the first adapter can be mounted within the tool housing 50 in order to facilitate continuity testing of the optical fiber stubs and the optical field fibers while the fiber optic connector 10 is mounted within the installation tool as will be described in more detail hereinafter. By mounting the second adapter within the tool housing, however, the installation tool of the present invention can operate in a more conventional manner by facilitating the mounting of the fiber optic connector upon the end portions of the optical field fibers without permitting continuity testing of the optical fiber stubs and the optical field fibers. Also, as described below, the second adapter could be used if the light source is attached to the optical field fibers rather than the optical fiber stubs.

Since the first and second adapters 54 are generally of different sizes, the installation tool 40 of the present invention also generally provides first and second bias members 57 adapted to engage the first and second adapters, respectively. In this regard, each bias member generally has a U-shape and defines a channel 67 through which the respective adapter extends. In this regard, the channel defined by the first bias member is preferably larger than the channel defined by the second bias member since the first adapter is also generally larger than the second adapter.

Each bias member 57 includes a slide member 62 capable of being mounted within the tool housing 50 and a biasing element 64 for urging the respective slide member into engagement with the shoulder 60 defined by the respective adapter 54. As shown in FIGS. 2, 5*a* and 5*b*, each slide member typically includes an engagement portion 66 disposed within the tool housing for engaging the shoulder of the respective adapter. In this regard, the engagement portion is generally U-shaped and defines the channel through which the second end 58 of the respective adapter extends. Each slide member also includes a base portion 68 disposed on the opposite side of the tool housing from the engagement portion. In this regard, the base portion is typically disposed between the tool housing and the base 42. In addition, each slide member includes a removable connector 70 interconnecting the engagement portion and the base portion. As depicted in FIG. 2, the tool housing preferably defines a lengthwise extending slot 72. As such, the removable connector can extend through the slot defined by the tool 30 housing in order to connect the engagement portion and the base portion and can ride within the slot as the slide member moves lengthwise relative to the tool housing.

Figure 4:
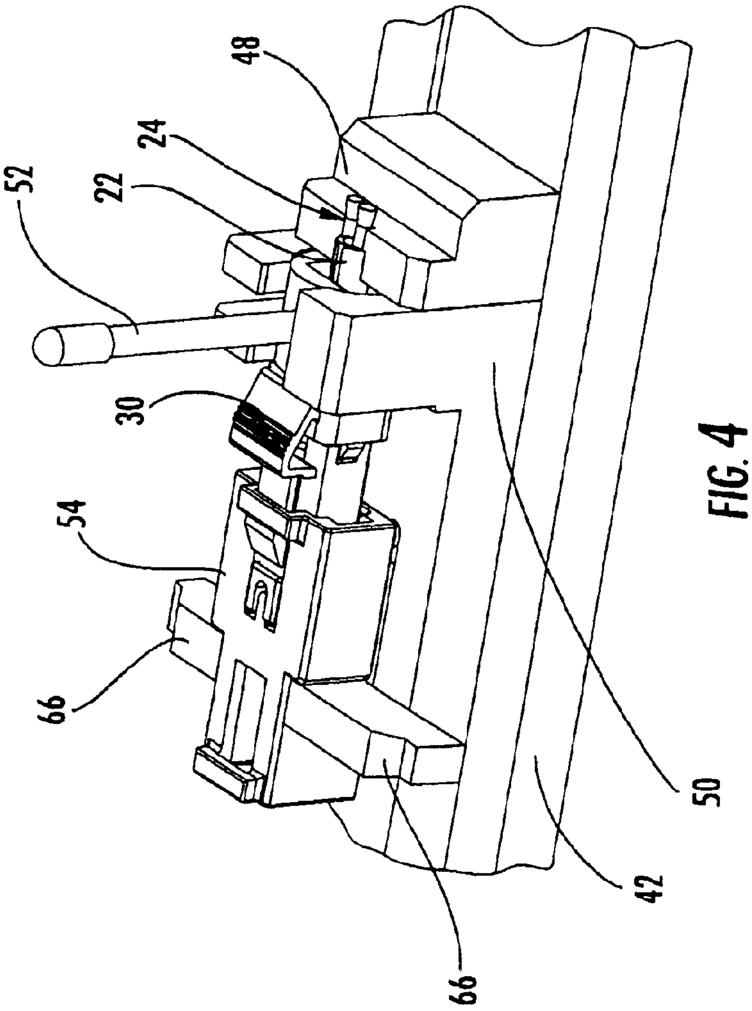
FIG. 4 is a fragmentary perspective view of the installation tool of FIGS. 2 and 3 having at least portions of the MT-RJ UNICAM fiber optic connector of FIG. 1 mounted therein.

The biasing element 64, such as a spring, typically engages the base portion 68 of each slide member 62 so as to bias or urge the slide member in a predetermined direction, such as to the right in FIG. 4. Thus, the adapter 54 can be secured in position between an upstanding portion of the tool housing and the slide member. For example, the slide member depicted in FIG. 4 can be moved to the left by a technician and an adapter inserted between the slide member and an upstanding portion of the tool housing. Once the slide member is released by the technician, the biasing element urges the slide member to the right and into contact with the shoulder 60 of the adapter, thereby securing the adapter and connector housing 30 against the upstanding portion of the tool housing.

By utilizing a common base portion 68 and a common biasing element 64, the installation tool 40 can be readily converted between the first and second configurations without substantially disassembling the installation tool. In order to change from the first configuration of the installation tool to the second configuration, the first adapter 54 is removed from the installation tool and the removable connector 70 is removed in order to disconnect the engagement portion 66 and the base portion 68. The engagement portion of the first bias member 57 is then replaced with the engagement portion of the second bias member and the removable connector is reinserted. Thereafter, the second adapter is inserted into the tool housing 50 to complete the reconfiguration process. By reversing these steps, the installation tool can also be easily converted from the second configuration to the first configuration, if so desired. Accordingly, the installation tool need not be disassembled, such as by removing the tool housing or any other component from the base 42, in order to be reconfigured. Thus, the same installation tool can function as a conventional installation tool in the second configuration in which a dust cover is mounted to the fiber optic connector 10 that is being mounted upon the end portions of the optical field fibers and which does not support continuity testing while the fiber optic connector is mounted within the installation tool, as well as a modified installation tool in the first configuration which permits continuity testing to be performed while the fiber optic connector is mounted within the installation tool, as described in more detail below.

Figure 6:
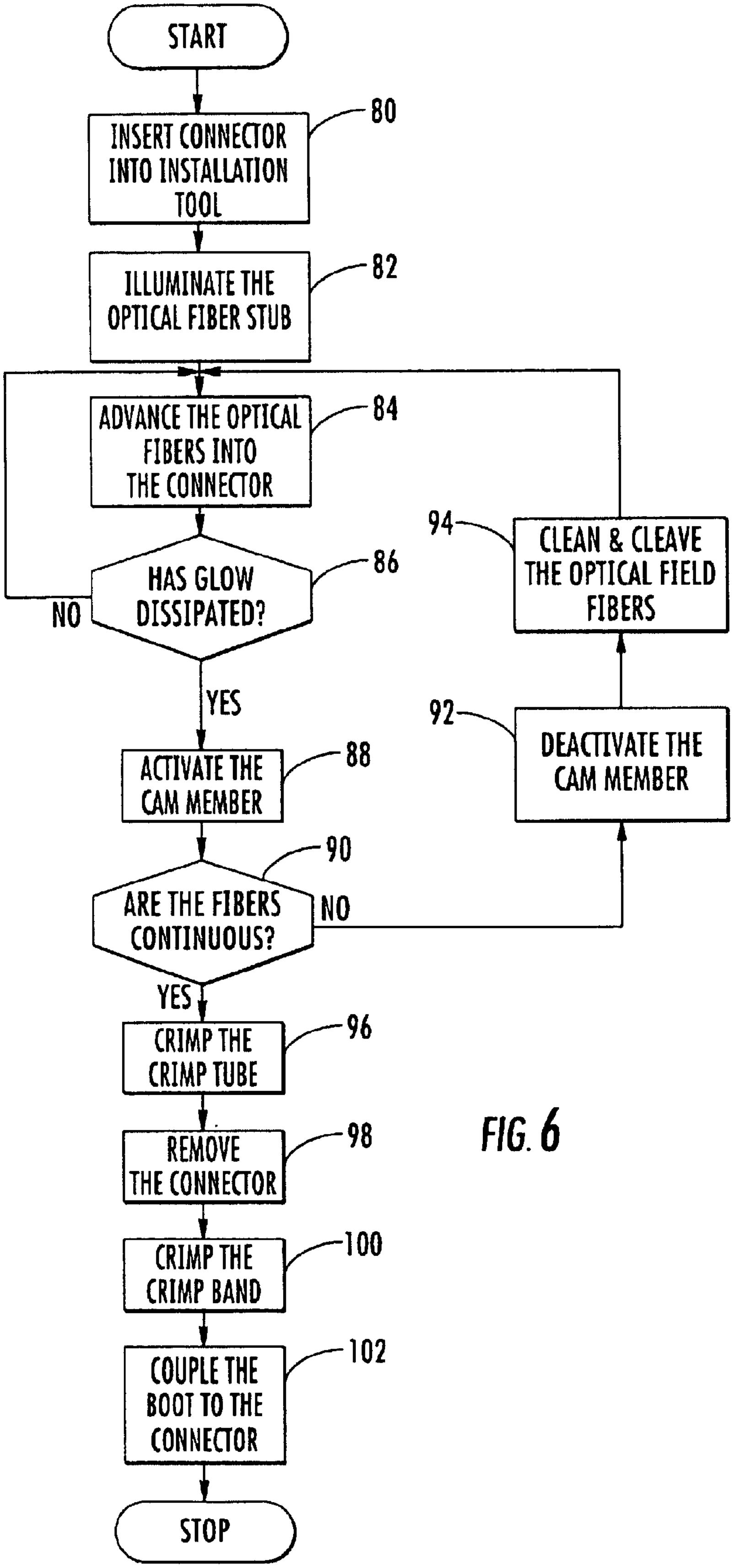
FIG. 6 is a flow chart illustrating the operations performed in order to validate the continuity of one or more optical field fibers with respective optical fiber stubs according to one embodiment of the present invention.

In order to test the continuity of the optical field fibers and the optical fiber stubs during the process of mounting a fiber optic connector 10, such as a MT-RJ UNICAM® connector, upon the end portions of the optical field fibers, at least portions of the fiber optic connector are initially mounted within the installation tool 40 that is assembled to have the first configuration. See block 80 of FIG. 6. In this regard, the fiber optic connector with the exception of the crimp band 26 and the boot 36 are assembled and the forward end of the housing 30 is inserted into the first end 56 of the adapter 54 for engagement therewith. While the crimp band and the boot are not assembled to the remainder of the fiber optic connector, the crimp band and the boot are mounted upon the optical field fibers prior to inserting the optical field fibers into the fiber optic connector. In addition to the engagement of the housing within the first end of the first adapter, the wrench 52 of the installation tool engages the cam member 20 of the fiber optic connector that has previously been mounted upon the ferrule holder 22.

In order to test the continuity of the optical fiber stubs and the optical field fibers, a light source is provided, such as a diode laser, for producing light signals having predetermined characteristics, such as a predetermined intensity and/or wavelength. The light produced by the light source is introduced into at least one of each pair of the optical fiber stubs and the optical field fibers. See block 82. As described hereinafter, the light is typically introduced into the optical fiber stubs. For example, in the illustrated embodiment in which a multifiber connector 10 is to be mounted upon a pair of optical field fibers, light is introduced into each of the two optical fiber stubs. While the light source can include a separate source for providing the light that is introduced into each optical fiber stub, a single light source is typically utilized with the light generated thereby being split prior to its introduction into the respective optical fiber stubs.

The light produced by the light source is typically delivered to the optical fiber stubs by means of one or more optical fiber jumpers upon which a fiber optic connector is mounted. Although not necessary, the fiber optic connector that is mounted upon the optical fiber jumpers from the light source is typically of the same type as the fiber optic connector 10 to be mounted upon the optical field fibers, such as an MT-RJ UNICAM® connector. The fiber optic connector associated with the optical fiber jumpers can therefore be inserted into the second end 58 of the adapter 54, i.e., the first adapter, such that light generated by the light source is introduced into each optical fiber stub of the fiber optic connector to be mounted to the optical field fibers. Alternatively, the light source could be introduced from the opposite end of the optical field fibers, rather than from the connector end. In this manner, the light would emanate from the ends of the optical field fibers rather than the optical fiber stubs. With the light emanating from the optical field fibers, either of the adapters 54 could be used.

While the light source is introducing light into the optical fiber stubs, the optical field fibers are inserted into the rear end of the fiber optic connector 10 and advanced therethrough until contact is established with the respective optical fiber stubs. See block 84. In the embodiment in which an MT-RJ UNICAM® connector is to be mounted upon a plurality of optical field fibers, the end portions of the optical field fibers are inserted through the crimp tube 24 and into respective grooves defined by the splice components. While the end portions of the optical field fibers are spaced apart from the optical fiber stubs, the light introduced into the optical fiber stubs generates a glow that emanates from the end portions of the optical fiber stubs within the splice components. Once the optical field fibers have made optical contact with the respective optical fiber stubs, either through direct physical contact or via index matching gel that is also disposed within the grooves defined by the splice components, the glow will dissipate since the light will be transmitted from the optical fiber stubs to respective optical field fibers. As such, the glow emanating from the end portions of the optical fiber stubs is preferably monitored as the optical field fibers are advanced into the fiber optic connector since the glow provides an indication of optical continuity. In order to permit the glow to be monitored, at least one of the cam mechanism and the splice components of the multifiber connector is translucent. Although one or all components could be translucent, the multifiber connector of one advantageous embodiment includes a cam member 20, a ferrule holder 22 and splice components that are each translucent to permit the technician to monitor the glow emanating from the end portions of each optical fiber stub.

Once the optical field fibers appear to have made optical contact with the respective optical fiber stubs as indicated by the dissipation of the glow associated with each optical fiber stub, the optical field fibers are no longer advanced and the cam mechanism is actuated to secure the optical field fibers in position relative to the optical fiber stubs. See blocks 86 and 88. In the embodiment in which an MT-RJ UNICAM connector 10 is mounted upon the end portions of a plurality of optical field fibers, the cam mechanism is actuated by rotating the cam member 20 relative to the ferrule holder 22 which, in turn, actuates the splice components and forces the splice components together. In order to facilitate the rotation of the cam member relative to the ferrule holder, the outwardly extending handle of the wrench 52 can be grasped by the technician and moved so as to rotate the cam member relative to the ferrule holder.

Once the cam mechanism has been actuated to secure the optical field fibers in position relative to the optical fiber stubs, the fiber optic connector 10 is evaluated to determine if the glow that previously emanated from the optical fiber stubs completely disappears, thereby indicating that the optical field fibers and the optical fiber stubs are continuous. See block 90. If the glow has not been extinguished and the continuity is therefore unacceptable, the cam mechanism is deactuated. See block 92. For example, the cam member 20 of an MT-RJ UNICAM® connector can be rotated relative to the ferrule holder 22 in order to deactuate the splice components by returning the wrench 52 to its original position. Thereafter, the optical field fibers can be repositioned relative to the optical fiber stubs. In addition to repositioning the optical field fibers, the optical field fibers can be withdrawn from the fiber optic connector, recleaved and cleaned prior being reinserted into the fiber optic connector and repositioned. See block 94. In this regard, the optical field fibers are generally cleaned of any index matching gel prior to being recleaved and thereafter recleaned with alcohol or the like.

During the repositioning of the optical field fibers, light continues to be introduced, typically into the optical fiber stubs, and the glow emanating from the end portions of the optical fiber stubs is again monitored to determine when continuity appears to have been established between each of the optical field fibers and the optical fiber stubs. Once the glow emanating from the end portion of each optical fiber stub dissipates, the cam mechanism can be reactuated to secure the optical field fibers in position relative to the optical fiber stubs. The fiber optic connector 10 can then again be inspected to determine if the glow has been completely extinguished. The repositioning and retesting of the continuity of the optical field fibers and the optical fiber stubs can be repeated as many times as necessary in order to obtain acceptable continuity between each pair of optical field fibers and optical fiber stubs.

Once the continuity of each pair of optical field fibers and optical fiber stubs has been verified by the extinguishment of the glow, the fiber optic connector 10 can be physically secured to the optical field fibers. In this regard, the crimp tube 24 is generally crimped about the optical fibers and, more commonly, about the buffer tubes. In order to crimp the crimp tube, the installation tool can include an arm 78 pivotally connected to the tool housing. By rotating the arm downwardly, the crimp tube can be compressed between the underside of the arm and the anvil 48, thereby crimping the crimp tube radially inward about the ferrule holder and securing the strength members therebetween. See block 96. Following crimping of the crimp tube, the arm is lifted and the fiber optic connector 10 is removed from the installation tool. See block 98. A crimp band 26 is then typically slid over the optical field fibers and the crimp tube and about the rear end of the ferrule holder 22 such that the strength members that extend lengthwise along with the optical field fibers are positioned between the crimp band and the ferrule holder. Once properly positioned, the crimp band is crimped radially inward so as to securely couple the strength members of the fiber optic cable and the fiber optic connector. See block 100. The boot 36 is then slid along the optical field fibers and inserted into the rear end of the housing so as to provide strain relief for the optical field fibers. See block 102.

Although the continuity of the optical field fibers and the optical fiber stubs is confirmed by the extinguishment of the glow emanating from the optical fiber stubs, the continuity of the optical field fibers and the optical fiber stubs can be further and/or alternatively evaluated by an additional test. In this regard, the fiber optic connector 10 is removed from the installation tool 40 after the cam mechanism has been actuated to secure the optical field fibers and the optical fiber stubs, but prior to crimping the crimp tube 24 about the optical fibers. The fiber optic connector is removed from the installation tool by disengaging the housing 30 and the adapter 54 from the slide member 62. The continuity of the optical field fibers and the optical fiber stubs can then be evaluated in a conventional manner. For example, a power meter, such as a JDS power meter, can be connected to the fiber optic connector through adapter 54 (functioning as a regular connector adapter) in order to introduce light into each pair of optical fiber stubs and optical field fibers and to measure attenuation of the light, typically by measuring the insertion loss and the back reflectance. If the insertion loss is unacceptably high or if the back reflectance is unacceptably low, it will generally be determined that the optical fiber stubs and the optical field fibers are not sufficiently continuous. Alternatively, if the insertion loss is relatively low and the back reflectance is relatively high, the testing will confirm that optical field fibers and the optical fiber stubs are continuous.

In either instance, the fiber optic connector 10 is then remounted within the installation tool 40 such as by inserting the housing 30 at least partially within the first end 56 of the first adapter 54. If the continuity of the optical field fibers and the optical fiber stubs is unacceptable, the cam mechanism can be deactuated and the optical field fibers can be repositioned as described above and as shown in blocks 92 and 94. If the continuity of the optical field fibers and the optical fiber stubs is acceptable, however, the crimp tube 24 is crimped about the optical fibers prior to removing the fiber optic connector from the installation tool and completing the assembly process as also described above and depicted in blocks 96–102.

By monitoring the continuity of the optical field fibers and the optical fiber stubs while the optical field fibers are inserted into the fiber optic connector 10, a technician can visually determine when continuity appears to have been established between each of the optical field fibers and the respective optical fiber stubs. In addition, by permitting the continuity to be further evaluated in the manner described above after actuating the cam mechanism and securing the optical field fibers in position relative to the optical fiber stubs, the continuity can be validated and, if it is determined that continuity has not actually been established between one or more of the optical field fibers and their respective optical fiber stubs, the cam mechanism can be deactuated, the optical field fibers can be repositioned, the cam mechanism reactuated and the process repeated until continuity is confirmed between each optical field fiber and the respective optical fiber stub.

Only once continuity is established between each optical field fiber and the respective optical fiber stub, as indicated by the extinguishment of the glow emanating from the optical fiber stubs, is the fiber optic connector 10 crimped onto the optical field fibers as described above. As such, the method and associated multifiber connector and installation tool 40 of the present invention reduce the time required to mount fiber optic connectors upon optical field fibers in the field and to test the continuity of the resulting optical connection. In addition, the method and the associated multifiber connector and installation tool of the present invention reduce the number of fiber optic connectors that must be scrapped, thereby reducing the overall costs associated with the connectorization of optical field fibers in the field.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of validating continuity of an optical fiber upon which a fiber optic connector is mounted, the method comprising:

providing a fiber optic connector including a ferrule defining at least one bore extending between opposed front and rear faces, an optical fiber stub disposed within the bore and extending beyond the rear face of the ferrule, and a cam mechanism;

introducing light into at least one of an optical field fiber and the optical fiber stub;

advancing the optical field fiber into the fiber optic connector such that a glow emanates from an end portion of the at least one of the optical field fiber and the optical fiber stub while the optical field fiber is advanced into the fiber optic connector;

actuating the cam mechanism to secure the optical field fiber in position relative to the optical fiber stub once the glow dissipates;

evaluating the continuity of the optical field fiber and the optical fiber stub once the cam mechanism has been actuated;

deactuating the cam mechanism in instances in which the evaluated continuity of the optical field fiber and the optical fiber stub is unacceptable such that the optical field fiber can be repositioned relative to the optical fiber stub; and reactuating the cam mechanism following the repositioning of the optical field fiber relative to the optical fiber stub.

2. A method according to claim 1 further comprising monitoring the glow emanating from an end portion of at least one of the optical field fiber and the optical fiber stub while the optical field fiber is advanced into the fiber optic connector.

3. A method according to claim 2 further comprising halting further advancement of the optical field fiber once the glow dissipates during said monitoring step.

4. A method according to claim 1 further comprising cleaving and cleaning the end portion of the optical field fiber following deactuation of the cam mechanism.

5. A method according to claim 4 further comprising repositioning the optical field fiber relative to the optical fiber stub following said cleaving and cleaning and prior to said reactuation of the cam mechanism.

6. A method according to claim 1 further comprising repeating the evaluation of the continuity of the optical field fiber and the optical fiber stub, the deactuation of the cam mechanism to permit repositioning of the optical field fiber relative to the optical fiber stub and the reactuation of the cam mechanism following the repositioning until the continuity is acceptable.

7. A method according to claim 6 further comprising crimping at least a portion of the fiber optic connector onto the optical field fiber once the continuity of the optical field fiber and the optical fiber stub is acceptable.

8. A method of validating continuity of a plurality of optical fibers upon which a fiber optic connector is mounted, the method comprising:

providing a fiber optic connector including a ferrule defining a plurality of bores extending between opposed front and rear faces, a plurality of optical fiber stubs disposed within respective bores and extending beyond the rear face of the ferrule, and a cam mechanism;

advancing a plurality of optical field fibers into the fiber optic connector and toward respective optical fiber stubs such that each optical field fiber is paired with a respective optical fiber stub;

introducing light into at least one of each pair of optical field fibers and optical fiber stubs while the optical field fibers are advanced into the fiber optic connector such that a glow emanates from within the fiber optic connector for each pair of optical field fibers and optical fiber stubs;

halting further advancement of each optical field fiber once the glow associated with the respective optical field fiber dissipates; and securing the position of each optical field fiber within the fiber optic connector relative to the respective optical fiber stub once the glow associated with each pair of optical field fibers and optical fiber stubs is dissipated.

9. A method according to claim 8 further comprising monitoring the glow associated with each pair of optical field fibers and optical fiber stubs while the optical field fibers are advanced into the fiber optic connector.

10. A method according to claim 8 wherein said securing comprises actuating a cam mechanism to secure the optical field fibers in position relative to the respective optical fiber stubs once the glow dissipates.

11. A method according to claim 10 further comprising evaluating the continuity of the optical field fiber and the optical fiber stub once the cam mechanism has been actuated.

12. A method according to claim 11 further comprising:

deactuating the cam mechanism if the continuity of the optical field fibers and the optical fiber stubs is unacceptable such that the optical field fibers can be repositioned relative to the respective optical fiber stubs; and reactuating the cam mechanism following the repositioning of the optical field fibers relative to the respective optical fiber stubs.

13. A method according to claim 12 further comprising repeating the evaluation of the continuity of the optical field fibers and the optical fiber stubs, the deactuation of the cam mechanism to permit repositioning of the optical field fibers relative to the respective optical fiber stubs and the reactuation of the cam mechanism following the repositioning until the continuity is acceptable.

14. A method according to claim 13 further comprising crimping at least a portion of the fiber optic connector onto the optical field fibers once the continuity of the optical field fibers and the respective optical fiber stubs is acceptable.

15. A multifiber connector comprising:

a multifiber ferrule extending lengthwise between opposed front and rear faces for receiving a plurality of optical fiber stubs;

splice components disposed proximate the rear face of said multifiber ferrule for aligning a plurality of optical field fibers to respective ones of the plurality of optical fiber stubs; and a cam mechanism for urging said splice components together to operably interconnect the aligned optical field fibers and the optical fiber stubs, wherein at least one of said cam mechanism and said splice components is translucent such that a glow emanating from therewithin that is indicative of a discontinuity between at least one pair of optical field fibers and optical fiber stubs is visible external to the multifiber connector.

16. A multifiber connector according to claim 15 wherein said cam mechanism comprises:

a sleeve in which said splice components are disposed, said sleeve defining a window through which said splice components are exposed; and a cam member disposed upon said sleeve for engaging said splice components via the window defined by said sleeve, wherein movement of said cam member relative to said sleeve urges said splice components together.

17. A multifiber connector according to claim 16 wherein said cam member is translucent.

* * * * *